Patented July 28, 1931

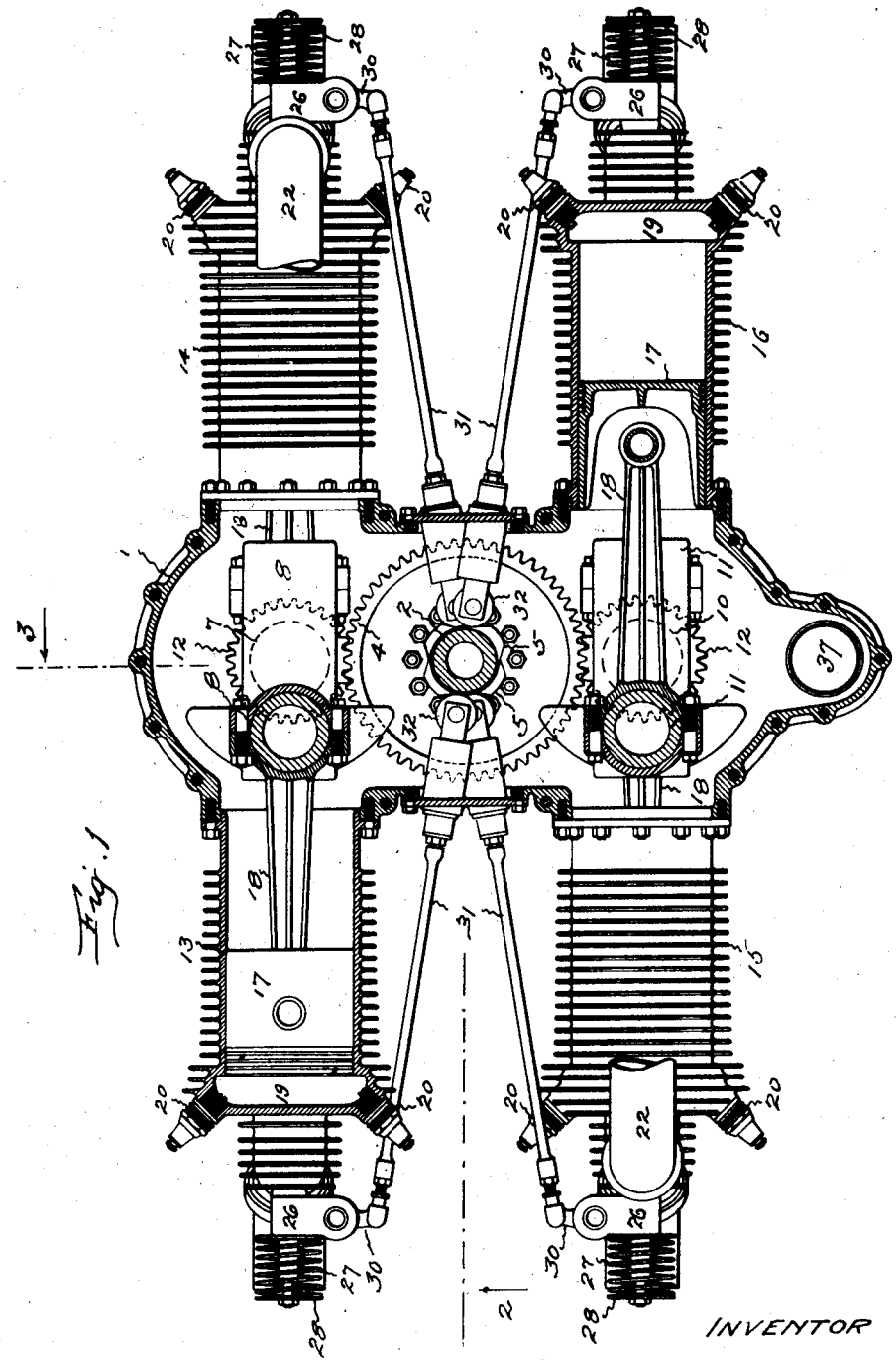

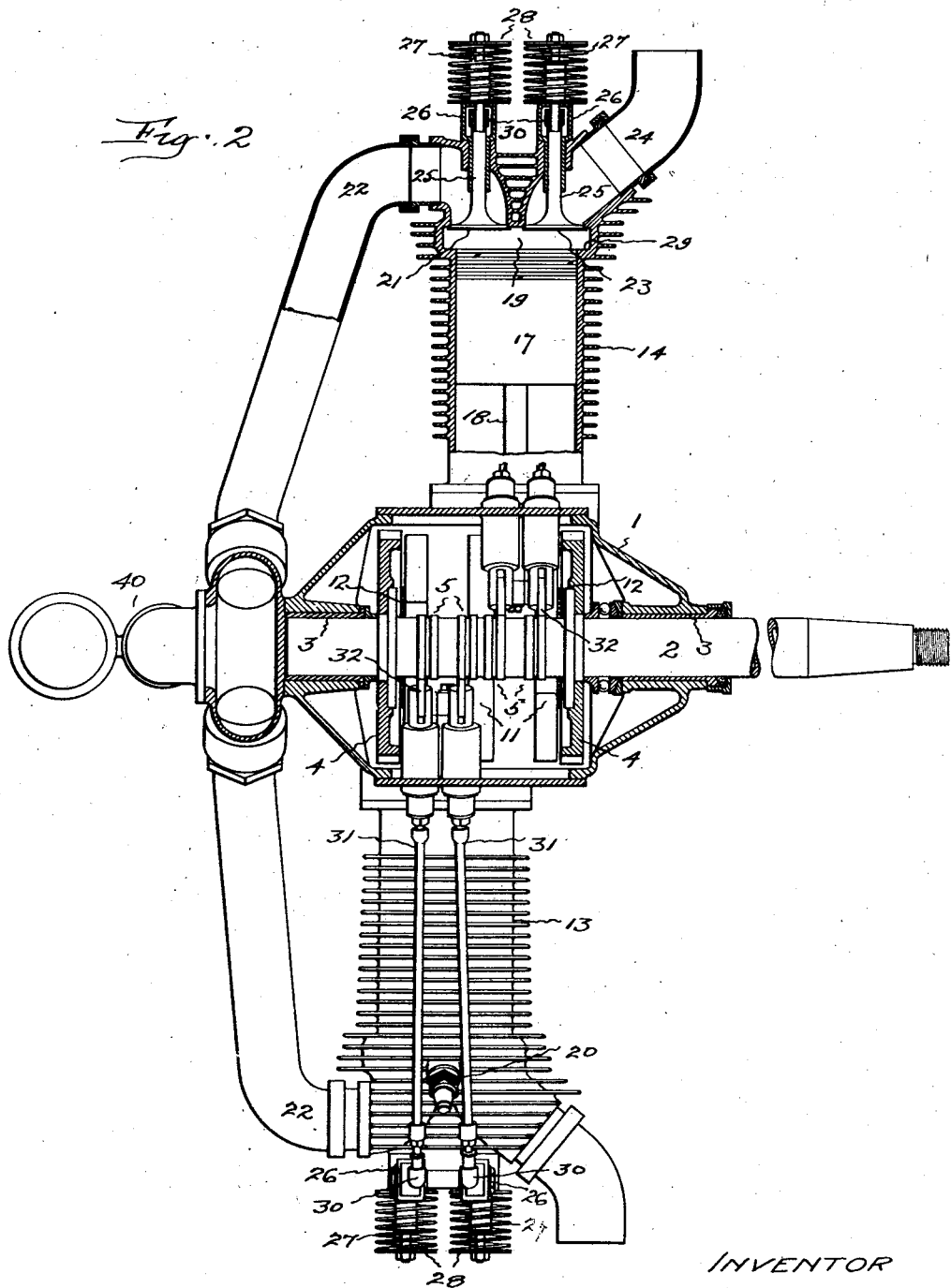

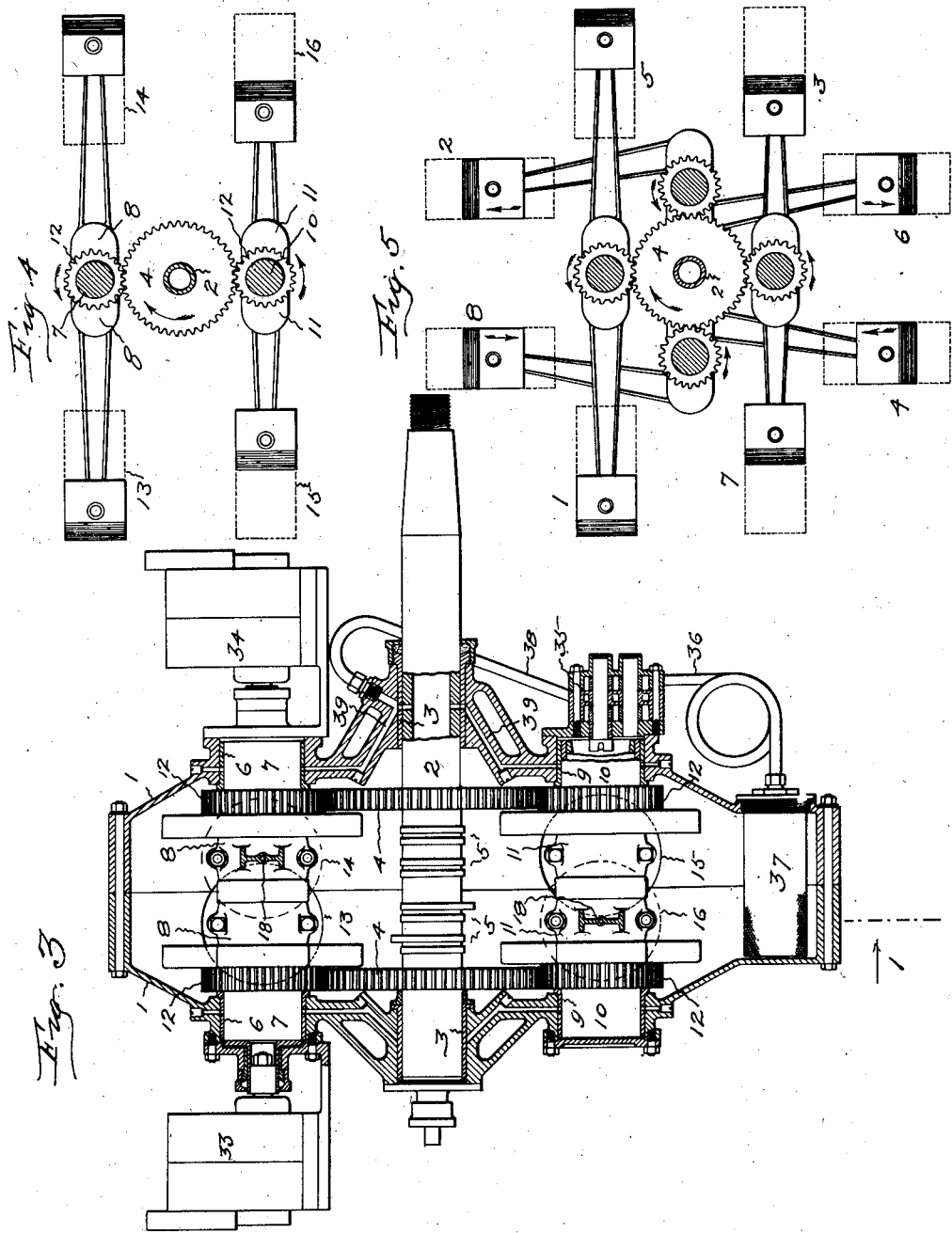

1,816,406

UNITED STATES PATENT OFFICE

LOUIS R. SPENCER, OF WEST HARTFORD, CONNECTICUT, ASSIGNOR TO SPENCER AIRCRAFT MOTORS, INCORPORATED, OF HARTFORD, CONNECTICUT, A CORPORATION OF CONNECTICUT

AEROPLANE ENGINE

Application filed August 20, 1927. Serial No. 214,269.

This invention relates to the construction of air cooled, fixed opposed cylinder, four cycle, internal combustion, aeroplane and hydroplane engines, which are particularly adapted for commercial and pleasure service.

The object of the invention is to provide an engine of the type mentioned having the cylinders so arranged and the pistons so connected with the propeller shaft that torsional strains and vibration will be reduced to a minimum, cooling will be increased to a maximum, and the most efficient engine speeds and most efficient propeller revolutions may be utilized, the elements being so designed that they are simple to manufacture, easy to assemble, convenient to renew or replace, and will have long life, and while strong and rugged are relatively light in weight so that the engine will be compact but have large sustained power per pound of weight and can be easily secured in the fuselage of a plane.

This object is attained by arranging the cylinders in opposed pairs, the axes of the cylinders of each pair, however, being out of alignment, and connecting the pair of pistons with cranks on strong crank shafts, that are parallel with the propeller shaft and are supported by large and widely separated bearings. Within the casing, near the ends of and fixed to each of the crank shafts are pinions that engage with widely separated gears fixed on a centrally located propeller shaft, the pinions on one crank shaft engaging the tops of the gears on the propeller shaft, and the pinions on the other crank shaft engaging the bottoms of the gears so that the inertia of the pistons and cranks is counter-balanced and the driving torque is applied to the propeller shaft on diametrically opposite sides at two localities. This arrangement of gears permits a two to one reduction of speed between the rotations of the crank shafts and revolutions of the propeller shaft, or a high rotative engine speed and a lower propeller speed, and allows the use of a straight, rigid propeller shaft supported by ample and well separated bearings that ensure long life and freedom from vibration, and also enables large long-wearing valve timing cams having smooth rises and falls, to be fixed to the propeller shaft centrally and between the gears. Each intake and exhaust valve is large, has a strong well guided stem and is located at the outer end of its cylinder in such manner that it cannot drop into the cylinder should its spring break, and the valve springs are arranged on the exterior at the extreme ends of the cylinder heads, where they are subjected to the least amount of heat and greatest cooling effect, which reduces the liability of breakage and enables quick repair should one become damaged. Firing magnetos, a lubricating pump, and a supercharger may be connected directly to the ends of the crank shafts, and a plurality of isolated spark plugs are applied to the end of each cylinder. The arrangement thus generally described produces an engine which is compact but that runs relatively cool, as the cylinders are located to obtain the maximum effect of air drafts and radiation, also an engine that is light in weight per horse power developed, and owing to the counter-balancing of the opposing pistons, the cross firing that is possible, and the application of the engine torque to four points on the propeller shaft destructive distortion and vibration are eliminated.

The engine is preferably built in units of four cylinders each, which units can be connected with the propeller shaft either singly or in multiple, as desired. One unit of four cylinders is illustrated, and an arrangement of two units is indicated, in the accompanying drawings.

Fig. 1 shows a vertical section through the center of the casing of one unit and two of the cylinders, taken on a plane that is transverse to the axis of the propeller shaft and is approximately indicated by the dot and dash line 1 on Fig. 3.

Fig. 2 is a horizontal section through the center of the casing and one cylinder, on a plane that is longitudinal with the axis of the propeller shaft and is indicated by the dot and dash line 2 on Fig. 1.

Fig. 3 is a central vertical section through the casing on a plane 3, Fig. 1, longitudinal with the propeller shaft.

Fig. 4 is a diagram illustrating the firing order of the cylinders of one unit.

Fig. 5 is a diagram illustrating the arrangement and firing order of two units connected to a single propeller shaft.

The casing 1 of the engine shown is divided at the middle, as illustrated in Figure 3, in order that one side may be removed to facilitate the assembling, inspection and repairs of the parts when necessary. The propeller shaft 2, which is tubular and straight, is supported by large bearing bushings 3 set into the center of the casing so that they are widely spread and provide rigid bearings for the propeller shaft.

Fixed on the propeller shaft inside of the casing are two gears 4 and fixed on the propeller shaft between these gears are valve timing cams 5.

Extending horizontally in the upper part of the casing and supported parallel with the propeller shaft by bearing bushings 6 set into the casing is a tubular shaft 7 with two opposite cranks 8 and similarly arranged in the lower part of the casing and supported by bearing bushings 9 set into the casing is a tubular shaft 10 with two opposite cranks 11. These bearings support the crank shafts at their ends and are of such size as to have long life. Fixed on each crank shaft within the casing near the bearings are two pinions 12 that mesh with the gears on the propeller shaft, the pinions and gears preferably having the ratio of 2 to 1. With this arrangement the rotations of the crank shafts are transmitted to the propeller shaft at four different points adjacent to the bearings, two being diametrically opposite each other near one side of the casing and two being diametrically opposite near the other side of the casing.

The cylinders, of which there are four, are detachably fastened to the casing in opposing pairs, the cylinders 13 and 14 forming the upper pair being opposite to but offset horizontally from each other, and the cylinders 15 and 16 forming the lower pair being opposed and horizontally offset from each other oppositely with relation to those of the upper pair. The pistons 17 in these cylinders are connected with the respective cranks on the crank shafts by piston rods 18.

In the outer end of each cylinder is an explosion chamber 19 that is somewhat larger in diameter than the diameter of the pistons. Two spark plugs 20 are fastened in the casing so as to extend into each of these chambers, Figure 1. Valves 21 control the admission ports from the intake pipes 22 to these chambers, and valves 23 control the outlet ports to the exhaust 24 from these chambers, Fig. 2. Each of these valves has a stem 25 that extends through a valve head 26 fastened in the end of the cylinder and on the outer end of each stem is a coiled spring 27 tensioned between a disk 28 fastened on the end of the stem and the valve head so as to normally keep the valve closed. The heads support the valves in such positions that should a spring break and allow a valve to drop that valve would lodge on the shoulder 29 around the explosion chamber, Figure 2, and not enter the working section of the cylinder. Each valve is opened by a lever 30 pivoted in the valve head, which lever is connected with a rod 31 that extends towards the center and through the casing and at its inner end has a roll 32 that is engaged with its proper cam on the propeller shaft, the cams of course being set to open the intake and exhaust valves at the correct times. Preferably the timing is such that first the cylinder 13, then the cylinder 16, then the cylinder 14 and finally the cylinder 15 are fired, Fig. 4. As the cranks, pinions and gears are related, when one cylinder of a pair is fired its opposed cylinder is taking in gas.

A magneto 33 is connected with one end of the upper crank shaft and if desired for the purpose of insuring the firing of the cylinders another magneto 34 may be connected with the other end of this crank shaft, as illustrated in Figure 3. A lubricating pump 35 may be connected with the end of the lower crank shaft and have one side connected by a pipe 36 with a strainer 37 in the lower part of the casing and the other side connected by a pipe 38 with passages 39 that lead to the several bearings of the propeller shaft and crank shafts. A carburetor 40 may be attached at the center of the casing and connected to the intake pipes 22, Fig. 2.

With the arrangement of reduction gearing illustrated the engine may be run at its most efficient high speed while the propeller shaft will be driven at a lower and its most efficient speed. As the crank shafts are relatively short and supported at their ends in large bearings and the pinions are located adjacent to the bearings and engaged with the propeller shaft gears at four points all the bearings will sustain high rotative shaft speeds with a minimum amount of wear. With the crank shaft pinions located within the casing and engaging with the gears on the propeller shaft diametrically opposite in two planes the propeller shaft is not subjected to the distortion that it would be if driven in one plane, and the wear on the propeller shaft bearings is greatly relieved by this distribution of the driving torque of the crank shafts, all of which also tends to eliminate torsional strains and vibration due to varying resistances resulting from the rotation of the propeller.

By opposing and cross firing the cylinders, as pointed out, the inertia of the pistons and cranks is counter-balanced, and this also tends to relieve the engine of vibration. Any cylinder can be easily removed when necessary and all the various required accessories may be readily attached so as to operate in synchronism with the parts with which they function. The separation of the cylinders permits a free circulation of air about them and radiation of heat from them, which insures a cool running of the engine.

Two or more of the above described units may be applied and geared to a single central propeller shaft, as indicated in Figure 5. In this case the firing times for the various cylinders would preferably be in the order of cylinders 1, 2, 3, 4, 5, 6, 7, and 8, respectively, as indicated on the drawings.

The invention claimed is:

1. An internal combustion engine comprising a propeller shaft, a pair of crank shafts arranged at diametrically opposite sides of the propeller shaft and geared thereto, each of said crank shafts having a pair of oppositely extending crank arms, a pair of opposed cylinders having their axes lying in a common plane but laterally offset, pistons working in said cylinders and respectively connected to the arms of one crank shaft, a second pair of opposed cylinders having their axes lying in a common plane but laterally offset, and pistons working in said cylinders and respectively connected to the arms of the other crank shaft, the axes of the cylinders at diametrically opposite sides of the propeller shaft being located in a common plane perpendicular to the plane containing the axes of the first and second pairs of cylinders, respectively.

2. An internal combustion engine comprising a propeller shaft, a pair of crank shafts arranged at diametrically opposite sides of the propeller shafts and geared thereto, each of said crank shafts having a pair of oppositely extending crank arms, a pair of opposed cylinders, 13 and 14, having their axes lying in a common plane but laterally offset, pistons working in said cylinders and respectively connected to the arms of one crank shaft, a second pair of opposed cylinders, 15 and 16, having their axes lying in a common plane but laterally offset, pistons working in said cylinders and respectively connected to the arms of the other crank shaft, the axes of the pairs of cylinders 13, 16 and 14, 15, located at diametrically opposite sides of the propeller shaft, being located in common planes perpendicular to the planes containing the axes of cylinders 13, 14 and 15, 16, respectively, and timing mechanism arranged to successively fire said cylinders in the order 13, 16, 14 and 15.

3. An internal combustion engine comprising a propeller shaft, a pair of crank shafts arranged at diametrically opposite sides of the propeller shaft and geared thereto, each of said crank shafts having two crank arms disposed at 180 degrees to each other, a pair of opposed cylinders adjacent one of said crank shafts, a piston working in each of said cylinders and connected to a crank arm of the adjacent crank shaft, a second pair of opposed cylinders adjacent the other of said crank shafts, and a piston working in each of said cylinders and connected to a crank arm of its adjacent crank shaft.

4. An internal combustion engine comprising a propeller shaft, a pair of crank shafts arranged at diametrically opposite sides of the propeller shaft and geared thereto, each of said crank shafts having two crank arms disposed at 180 degrees to each other, a pair of opposed cylinders adjacent one of said crank shafts, a piston working in each of said cylinders and connected to a crank arm of the adjacent crank shaft, a second pair of opposed cylinders adjacent the other of said crank shafts, and a piston working in each of said cylinders and connected to a crank arm of its adjacent crank shaft, said crank shafts having such timing that the pistons in one opposed pair of cylinders are at the ends of their inward travel when the pistons in the other opposed pair of cylinders are at the ends of their outward travel.

5. In an internal combustion engine, a crank case, a propeller shaft, bearings for said shaft journaled in opposite side walls of said crank case, a crank shaft, main bearings for said crank shaft journaled in said side walls, said crank shaft having a crank portion intermediate said main bearings, a pair of identical gears keyed to said crank shaft, one on each side of said crank portion adjacent the respective main bearing and a pair of identical gears on said propeller shaft adjacent its bearings and meshed with said first pair of gears.

6. In an internal combustion engine, a crank case, a propeller shaft, bearings for said shaft journaled in opposite side walls of said crank case, a crank shaft, main bearing for said crank shaft journaled in said side walls, said crank shaft having a crank portion intermediate said main bearings, a pair of identical gears keyed to said crank shaft, one on each side of said crank portion adjacent the respective main bearing and a pair of identical gears on said propeller shaft adjacent its bearings and meshed with said first pair of gears, said propeller shaft gears having a ratio of 1 to 2 with respect to said crank shaft gears, and said propeller shaft having cams thereon and constituting the camshaft of said engine.

LOUIS R. SPENCER.